United States Patent [19]

Smith et al.

[11] E Re. 29,783

[45] Reissued Sep. 26, 1978

[54] PROCESS FOR TREATING AQUEOUS CHEMICAL WASTE SLUDGES AND COMPOSITIONS PRODUCED THEREBY

[75] Inventors: Charles L. Smith, Conshohocken; William C. Webster, Warminster, both of Pa.

[73] Assignee: IU Technology Corporation, Miami, Fla.

[21] Appl. No.: 766,796

[22] Filed: Feb. 8, 1977

Related U.S. Patent Documents

Reissue of:

[64] Patent No.: 3,720,609
Issued: Mar. 13, 1973
Appl. No.: 29,561
Filed: Apr. 17, 1970

[51] Int. Cl.[2] ..... C02C 5/02

[52] U.S. Cl. ..... 210/59; 106/109; 106/DIG. 1; 423/DIG. 2

[58] Field of Search ..... 106/103, 104, 109, 117, 106/DIG. 1; 210/24, 28, 42 R, 45, 47, 51–53, 59, 66, 67; 423/554–556, 558, 170, 242, 127, 636, DIG. 1, DIG. 2

[56] References Cited

U.S. PATENT DOCUMENTS

| | | | |
|---|---|---|---|
| 584,397 | 6/1897 | Nahsen | 106/120 |
| 1,185,773 | 6/1916 | Conwell | 106/89 |
| 1,185,774 | 6/1916 | Conwell | 106/118 |
| 1,456,924 | 5/1923 | Haynes | 106/118 |
| 1,672,584 | 6/1928 | Travers | 210/43 |
| 2,165,344 | 7/1939 | Colton | 106/109 |
| 2,184,271 | 12/1939 | Colton | 106/109 |
| 2,532,548 | 12/1950 | Heide | 210/45 |
| 2,606,127 | 8/1952 | Weber | 106/109 |
| 2,746,920 | 5/1956 | Wunderley | 210/28 |
| 2,803,556 | 8/1957 | Carlsson et al. | 106/109 |
| 2,810,633 | 10/1957 | Cooper | 210/45 |
| 3,155,526 | 11/1964 | Klein | 106/89 |
| 3,164,463 | 1/1965 | Graham et al. | 423/147 |
| 3,388,060 | 6/1968 | Clark | 210/52 |
| 3,446,731 | 5/1969 | Harsh | 210/53 |
| 3,510,326 | 5/1970 | Miki | 106/109 |
| 3,565,648 | 2/1971 | Mori et al. | 106/89 |
| 3,634,115 | 1/1972 | Minnick | 106/85 |

FOREIGN PATENT DOCUMENTS

| | | |
|---|---|---|
| 1,051,116 | 1/1954 | France. |
| 235,257 | 6/1925 | United Kingdom. |

OTHER PUBLICATIONS

Nicol, "On the Mixture of Slag-Flue Dust at Elevated $CaSO_4$ Contents and Deficient in Lime", 29th Int. Cong. of Ind. Chem., Paris, Nov. 1956.

Plumley et al., "Removal of $SO_2$ and Dust from Stack Gases", American Power Conference, Chicago, Apr. 25–27, 1967.

Cockrell et al., Interim Report, Cont. No. PH86-6-7-122, Limestone Symposium, Clearwater, Fla., Dec. 4–8, 1967.

Cockrell et al., Study of the Potential for Profitable Utilization of Pulverized Coal Flyash Modified by the Addition of Limestone-Dolomite Sulfur Dioxide Removal Additives", Final Report, Contract No. PH86-6-7-122, Apr. 30, 1969.

Cockrell et al., "New or Underdeveloped Methods for Producing and Utilizing Coal Ash", Second Flyash Utilization Symposium, Mar. 1970.

Martin et al., "The C-E Air Pollution Control System", Industrial Coal Conference, Univ. of Kentucky, Apr. 3–9, 1970.

Minnick et al., "Lime-Fly Ash Composition for Use in Highway Construction", 13th Annual Meeting of Highway Research Board, Dec. 1950.

Davidson et al., "Activation of the Lime-Flyash Reaction by Trace Chemicals", *Lime & Lime Flyash as Soil Stabilizers*, Highway Research Board Bulletin 231, 38th Annual Meeting, Jan. 5–9, 1959.

Minnick, "Reactions of Hydrated Lime with Pulverized Coal Fly Ash", Fly Ash Utilization Symposium, Mar. 14–16, 1967, pp. 287–310.

*Primary Examiner*—Charles N. Hart
*Assistant Examiner*—Peter A. Hruskoci
*Attorney, Agent, or Firm*—Miller & Prestia

[57] ABSTRACT

Waste sludges containing small amounts of certain types of reactive materials are treated by adding to such sludges materials capable of producing aluminum ions, lime and/or sulfate bearing compounds to produce a composition having a sufficient concentration of sulfate ions, aluminum ions and equivalents thereof, and calcium ions and equivalents thereof. Fly ash is preferred source of aluminum ions for this purpose. Over a period of time such compositions harden by the formation of calcium sulfo-aluminate hydrates. Hardening of the sludge facilitates its disposition and may permit the reclamation of the land now occupied by large settling ponds for such sludge. Still further, the solidification of such settling ponds may provide permanent land fill which permits immediate use of the land without the necessity for removal of the sludge. Aggregate materials may also be incorporated in the solidified waste.

19 Claims, No Drawings

PROCESS FOR TREATING AQUEOUS CHEMICAL WASTE SLUDGES AND COMPOSITIONS PRODUCED THEREBY

Matter enclosed in heavy brackets [ ] appears in the original patent but forms no part of this reissue specification; matter printed in italics indicates the additions made by reissue.

The present invention pertains to the treatment of aqueous chemical waste sludges, utilizing residual amounts of certain reactant materials commonly found in such sludges, whereby the sludges are converted into hardenable material.

Common by-products of plants in which chemicals are made or treated on an industrial scale are aqueous sludges often containing a high proportion of relatively inert fine particulate materials and a variety of reactive materials in sufficiently small concentrations as to make the reclamation thereof uneconomical. In some instances, industrial wastes may be relatively monocompositional in character (As for example, the manufacture of hydrofluoric acid can yield waste sludge with a solids content which is in excess of 98 percent calcium sulfate.), but even in these cases the materials are not generally utilized in commercial applications due to the uncertainties regarding the other materials which may be present in varying quantities. Often the available reactive compounds in the sludge solids include concentrations in the 0.5–5.0 weight percent range of common materials such as sulfate ions, calcium ions, aluminum ions, and iron ions or sources thereof. The water content of such sludges may vary considerably, and is typically in the range of 10–90 percent by weight. The disposition of such sludges has always been a problem. With the increasing awareness of the undesirability of discharging such waste materials into the environment and the resulting governmental regulation of such discharges, the need for a convenient, harmless, and economical way of disposing of such sludges or converting them into a useful product is becoming increasingly apparent. A further incentive is provided by the capital investment and land required for the disposition of such sludges by conventional means, which often include large settling ponds or storage piles.

Another and entirely different kind of waste material is that referred to herein as fly ash. This is the finely divided ash residue produced by the combustion of pulverized coal which is carried off with the gases exhausted from boilers or furnaces in which such coal (typically in electric generating stations) is burned and which is collected from these gases usually by means of suitable precipitation apparatus such as electrostatic precipitators. Finely pulverized ashes resulting from combustion of oil and from combustion of waste materials in large incinerators may sometimes by used interchangeably with fly ash providing their chemical compositions and physical state are reasonably similar to pulverized coal fly ash. Fly ash is a heterogenious mixture of both crystalline and non-crystalline particulate material which includes a variety of chemical elements (in various forms) including, among others, calcium, aluminum, iron and sulfur.

Fly ash has been used heretofore, with lime, to produce a variety of cementitious materials. Nevertheless, fly ash is an inexpensive, readily available waste material, the supply of which exceeds its use, thereby necessitating its disposition as a waste material. While relatively large quantities of fly ash are also used as a filler material, its value in such application is limited.

It is therefore an object of the present invention to provide a method for treating aqueous chemical waste sludges by the utilization of residual reactive material therein, and certain commonly available additive materials, to solidify such sludges either for the purpose of facilitating the disposition thereof or for hardening the sludge as a land fill or base material thereby permitting use of land now occupied by such sludges, raising the ground level of low-lying or boggy areas, or extending land areas into regions previously occupied by water.

It is a further object of this invention to provide a new construction base or fill material produced from aqueous chemical waste sludges by the addition thereto of other commonly available materials.

Briefly, the present invention includes a method for treating by-product sludges from chemical plants and treating facilities and the product of this treating method. In this method, residual reactive materials, including sulfate ions, aluminum ions, iron ions, calcium ions and magnesium ions or sources of these ions present in various forms in the sludge, are reacted with ion yielding aluminum compounds, lime and soluble sulfates, added when necessary to raise the concentrations of these materials in the sludge above certain minimum levels, to produce a composition which will harden over a period of time, usually on the order of days or weeks. The sludge may therefore be handled in solid form for disposition. Alternatively, the hardenable composition may be used as a cementitious material either as a filler or base material in some other location or in the place of treatment, e.g., a settling pond. For the latter purpose an aggregate material may be included in the hardenable sludge mixture.

The sludge treatment process of the present invention depends on the formation of cementitious materials generally known as calcium sulfo-aluminate hydrates or calcium alumino-sulfate hydrates. The basic reactants in this process are calcium ions, aluminum ions, and sulfate ions. Further, iron ions may be substituted for the aluminum ions; and magnesium ions may be substituted for the calcium ions. Certain minimum concentrations of these materials must be present and available for reaction to produce the hardenable composition of the present invention. When tested, in accordance with the procedure described hereinafter, the dry weight percent of available sulfate ions should be not less than 0.5 percent; that of aluminum ions, or equivalents thereof, expressed as aluminum oxide, 0.2 percent; and calcium ions, or equivalents thereof, expressed as calcium oxide, 0.5 percent.

In the accompanying drawing, which is a ternary composition diagram of the available aluminum, calcium, sulfate ions in the system there is shown a preferred range of available reactants in the composition produced by treating waste sludges as disclosed herein. More specifically, this range may be expressed as preferred ratios of available ions. These preferred ratios are as follows, wherein $Al^{+3}$ and $Ca^{+2}$ include $Al^{+3}$ and $Ca^{+2}$ equivalents respectively:

$Al^{+3}:Ca^{+2}$, from 1:10 to 1:2

$Al^{+3}:(SO_4)^{-2}$, from 1:2 to 1:10

$Ca^{+2}:(SO_4)^{-2}$, from 1:2 to 2:1

It will be appreciated that the foregoing preferred range is based on the chemical reaction necessary for solidification of the sludge. Often, the availability and cost of one of the materials may be such that an excess of this material is used even though this increases the proportion of available reactants contributed by this material above the preferred range.

It will be apparent that in the large variety of chemical making processes and chemical treating processes conducted in numerous plants throughout the country, a multitude of types of aqueous waste sludges are produced. These sludges have in common only the fact that they include some residual amounts of reactive materials, including most often common chemical materials such as calcium ions, aluminum ions, and sulfate ions or sources thereof. Depending on the particular sludge to be treated therefore, the amount and type of material which must be added to produce the hardenable composition as taught herein will obviously vary. In some cases, practically nothing but a small amount of fly ash may be needed while in other cases materials contributing all three of the reactive materials may be necessary to solidify or treat the sludge in accordance with the present invention.

Aluminum compound bearing waste materials, generally, and fly ash, specifically, are preferred additive materials, as the source of aluminum ions because of their low price, availability and high reactivity. Lime, which includes quicklime and hydrated lime (slaked lime) is the preferred material for increasing the concentration of calcium ions or one of its equivalents, namely magnesium. Materials of various types may be added to raise the available sulfate ions concentration as needed. Typical of these are calcium sulfate anhydrite, calcium sulfate hemihydrate (plaster of paris) and calcium sulfate dihydate (gypsum).

In treating any specific sludge the determination of which of these treating chemicals should be used and in what quantity they should be added may be made in a number of ways. If it is known for example, that the sludge is primarily a lime neutralized acid waste sludge in which the proportion of calcium sulfate is relatively high, the treatment may be carried out by addition of an aluminum ion source, such as aluminum ion yielding wastes or fly ash. In some cases, a determination of available ionic concentrations and comparison of the ratios of these concentrations to the preferred ionic ratios taught herein may be the most convenient way of determining which and how much of the treating chemicals are necessary. Trial and error based on the known characteristics of the sludge is a very practical approach which may often be used. The available sulfate ion, aluminum ions or equivalents thereof, and calcium ions or equivalents thereof, may also be determined by the following test devised for the purpose of determining the availability of these materials to the reaction upon which the present invention is based. Necessarily, this availability is defined in terms of dry weight percent sulfate ion, dry weight percent aluminum ions and equivalents thereof (expressed as aluminum oxide), and dry weight percent calcium ions, and equivalents thereof (expressed as calcium oxide).

In determining the available aluminum ions or equivalents thereof, ferric ions ($Fe^{+++}$) are considered as equivalents. Ferrous ions ($Fe^{++}$) will not react directly, although under certain conditions ferrous ions will oxidize to ferric ions and become useable substitutes for aluminum ions. Available ferrous ions are therefore not generally included as available aluminum ion equivalents.

TEST PROCEDURE

Place 7.500 grams of the material under test in a small vial of approximately 14 ml. capacity. (The materials which shall be tested are the cementitious (non-aggregate) portion of the composition). Add sufficient water to fill the vial, stirring continuously so that a uniform mixture is maintained. Seal the vial with a screw cap and store at 38° C. Open the vial at the age of 7 days and transfer the liquid contents of the vial to a 250 ml beaker and the solid cake to a mortar. Grind the cake with the addition of some water until a uniform slurry is formed and no large lumps remain. Transfer this slurry to the same 250 ml beaker and adjust the volume to 100 ml.

Add 100 ml of HCl (1 to 4.5 dilution ratio to yield an overall final concentration of free HCl equivalent to a dilution volume ratio of 1:10). Allow the beaker and its contents to stand overnight after frequent stirring for the first several hours. Filter the liquid into a 250 ml flask and wash the residue thoroughly with hot water. Allow the liquid to cool and fill the flask to the mark. Aliquots of this solution shall be used for the determination of the acid soluble constituents.

Available $Al^{+3}$ and $Fe^{+3}$ (reported as weight of molar equivalent amount of $Al_2O_3$), $Ca^{+2}$ and $Mg^{+2}$ (reported as CaO) and $SO_4^{-2}$ is then determined in the resulting filtrate using atomic absorption spectrograph X-ray spectograph, or some other standard [qualitative] *quantitative* elemental analytical procedure.

The following are several examples in which the present invention has been used to produce solidified load-bearing products from aqueous chemical waste sludges from industrial chemical plants, or synthetic approximations thereof.

EXAMPLE 1

Using a synthetic pickle liquor (approximately that which might be discharged by a steel plant) consisting of a water solution containing 10,000 ppm $Fe^{++}$ and 150,000 ppm $SO_4^-$ ions, sludges were formed by neutralizing portions of this liquor to approximately pH 7 and in excess of pH 12 with dolomitic monohydrated lime. The two sludges so prepared were treated by addition of varying weight percentages of fly ash (by weight of sludge) as indicated in the table below. The blended materials were placed in segments of glass tubing 2 inches in diameter and 6 inches long which were capped at the bottom end with nylon cloth held in place with a rubber band. The filled test assemblies were placed in 1 inch of deionized water in aquaria.

At varying intervals as indicated in the table these specimens were tested for resistance to penetration (determined as resistance in lbs./sq. in. required for penetration of 1 inch into the specimen by a 0.025 sq. in. rod).

PENETRATION RESISTANCE OF SLUDGE/FLY ASH MIXTURES

| Sludge Type | Sludge pH | % Added fly ash | Deionized Water 2 weeks | 4 weeks | 8 weeks |
|---|---|---|---|---|---|
| Dol. | 12+ | 0 | 0 | 0 | 0 |
| Dol. | 12+ | 10 | 0 | 0 | * |
| Dol. | 12+ | 20 | 0* | * | * |
| Dol. | 12+ | 50 | 2200 | 3200 | * |
| Dol. | 12+ | 75 | 3000 | 5600 | 8000+ |
| Dol. | 12+ | 100 | 4400 | 8000 | 8000+ |
| Dol. | 7 | 0 | 0 | 0 | 0 |
| Dol. | 7 | 10 | 0 | 0 | 0 |
| Dol. | 7 | 20 | 0 | 0 | 0 |
| Dol. | 7 | 50 | 0 | 0 | 400 |

-continued

PENETRATION RESISTANCE OF SLUDGE/FLY ASH MIXTURES

| Sludge Type | Sludge pH | % Added fly ash | Deoionized Water 2 weeks | 4 weeks | 8 weeks |
|---|---|---|---|---|---|
| Dol. | 7 | 75 | 0 | 400 | 1400 |
| Dol. | 7 | 100 | Trace | 1400 | 1840 |

*Indicates glass tube cracked (usually from expansive forces), no reading possible in most cases.

EXAMPLE 2

Specimens were prepared as in Example 1 using dolomitic monohydrated lime to neutralize synthetic pickle liquor to approximately pH 7 and in excess of pH 12. These were placed in test assemblies as in Example 1 but were cured in sea water.

PENETRATION RESISTANCE OF SLUDGE/FLY ASH MIXTURES

| Sludge Type | Sludge pH | % Added Fly Ash | Sea Water 2 weeks | 4 weeks | 8 weeks |
|---|---|---|---|---|---|
| Dol. | 12+ | 0 | 0 | 0 | 0 |
| Dol. | 12+ | 10 | 0 | 400 | * |
| Dol. | 12+ | 20 | 400 | 2000 | 1000 |
| Dol. | 12+ | 50 | 3200 | 2400 | 8000* |
| Dol. | 12+ | 75 | 3600 | 4800 | * |
| Dol. | 12+ | 100 | 6200 | 8000+ | * |
| Dol. | 7 | 0 | 0 | 0 | 0 |
| Dol. | 7 | 10 | 0 | 0 | 0 |
| Dol. | 7 | 20 | 0 | 0 | 0 |
| Dol. | 7 | 50 | 0 | 0 | 440 |
| Dol. | 7 | 75 | 0 | 600 | 2400 |
| Dol. | 7 | 100 | 600 | 1400 | 2800 |

*Indicates glass tube cracked (usually from expansive forces), no reading possible in most cases.

EXAMPLE 3

Specimens were prepared as in Example 1 using dolomitic monohydrated lime to neutralize synthetic pickle liquor to approximately pH 7 and in excess of pH 12. These were placed in test assemblies as in Example 1 but were cured in synthetic mine effluent consisting of a water solution containing 300 ppm $Fe^{++}$ and 75 ppm $Al^{+++}$, adjusted to pH 3 with sulfuric acid.

PENETRATION RESISTANCE OF SLUDGE/FLY ASH MIXTURES

| Sludge Type | Sludge pH | % Added Fly Ash | Mine Water 2 weeks | 4 weeks | 8 weeks |
|---|---|---|---|---|---|
| Dol. | 12+ | 0 | 0 | 0 | 0 |
| Dol. | 12+ | 10 | 0 | 0 | 0 |
| Dol. | 12+ | 20 | Trace | * | * |
| Dol. | 12+ | 50 | 2400 | 4800 | * |
| Dol. | 12+ | 75 | 1200* | * | * |
| Dol. | 12+ | 100 | 4800 | * | * |
| Dol. | 7 | 0 | 0 | 0 | 0 |
| Dol. | 7 | 10 | 0 | 0 | 0 |
| Dol. | 7 | 20 | 0 | 0 | 0 |
| Dol. | 7 | 50 | 0 | 0 | Trace |
| Dol. | 7 | 75 | 0 | 800 | 800 |
| Dol. | 7 | 100 | Trace | 1600 | 1600 |

*Indicates glass tube cracked (usually from expansive forces), no reading possible in most cases.

EXAMPLE 4

Specimens were prepared as in Example 1 using high calcium hydrated lime to neutralize synthetic pickle liquor to above pH 12. These were placed in test assemblies as in Example 1 and were cured in deionized water.

PENETRATION RESISTANCE OF SLUDGE/FLY ASH MIXTURES

| Sludge Type | Sludge pH | % Added Fly Ash | Deionized Water 2 weeks | 4 weeks | 8 weeks |
|---|---|---|---|---|---|
| Hi Cal | 12+ | 0 | 0 | 0 | 0 |
| Hi Cal | 12+ | 10 | 0 | 0 | 0 |
| Hi Cal | 12+ | 20 | 0 | 400 | 1840 |
| Hi Cal | 12+ | 50 | 1400 | 4000 | 3200 |
| Hi Cal | 12+ | 75 | 1800* | * | * |
| Hi Cal | 12+ | 100 | 3800 | 8000+ | 8000+* |

*Indicates glass tube cracked (usually from expansive forces), no reading possible in most cases.

EXAMPLE 5

Specimens were prepared as in Example 1 using high calcium lime to neutralize synthetic pickle liquor to above pH 12. These were placed in test assemblies as in Example 1 but were cured in sea water.

PENETRATION RESISTANCE OF SLUDGE/FLY ASH MIXTURES

| Sludge Type | Sludge pH | % Added Fly Ash | Sea Water 2 weeks | 4 weeks | 8 weeks |
|---|---|---|---|---|---|
| Hi Cal | 12+ | 0 | 0 | 0 | 0 |
| Hi Cal | 12+ | 10 | 0 | 0 | 0 |
| Hi Cal | 12+ | 20 | 0 | Trace | 4000 |
| Hi Cal | 12+ | 50 | 2600 | 3600 | 5600 |
| Hi Cal | 12+ | 75 | 2800* | * | * |
| Hi Cal | 12+ | 100 | 2800* | * | * |

*Indicates glass tube cracked (usually from expansive forces), no reading possible in most cases.

EXAMPLE 6

Specimens were prepared as in Example 1 using high calcium hydrated lime to neutralize synthetic pickle liquor to above pH 12. These were placed in test assemblies as in Example 1 but were cured in synthetic mine effluent consisting of a water solution containing 300 ppm $Fe^{++}$ and 75 ppm $Al^{+++}$, adjusted to pH 3 with sulfuric acid.

PENETRATION RESISTANCE OF SLUDGE/FLY ASH MIXTURES

| Sludge Type | Sludge pH | % Added Fly Ash | Mine Water 2 weeks | 4 weeks | 8 weeks |
|---|---|---|---|---|---|
| Hi Cal | 12+ | 0 | 0 | 0 | 0 |
| Hi Cal | 12+ | 10 | 0 | 0 | 0 |
| Hi Cal | 12+ | 20 | 0 | 0 | 1680 |
| Hi Cal | 12+ | 50 | 1400 | 4600 | 4200 |
| Hi Cal | 12+ | 75 | 1800 | 3600 | 4800 |
| Hi Cal | 12+ | 100 | 2400* | ** | |

*Indicates glass tube cracked (usually from expansive forces), no reading possible in most cases.

EXAMPLE 7

A synthetic pickle liquor including 150,000 ppm $SO_4^-$ ion and 10,000 ppm $FE^{++}$ ion was prepared and divided into several portions. The portions were neutralized with dolomitic monohydrated lime to different pH's. The resulting sludge mixtures had pH's of 4, 8, and 12. Each of these wet sludges was mixed with a typical bituminous fly ash in five additive ratios. The compositions prepared were placed in 2 inch diameter glass tubes (6 inches long) which were capped at one end with nylon cloth held in place with a rubber band. These test assemblies were placed in separate aquaria (so that leaching effects of the extremely different pH's cause no side effects) containing 1 inch of deionized water. At the intervals indicated below the individual compositions were tested for resistance to penetration. Penetration resistance was measured as the effort in lbs/sq. in. required to force a 0.025 sq. inch rod 1 inch into the mix.

| Sludge | | Fly ash | Penetration Resistance (psi) | | |
|---|---|---|---|---|---|
| pH | weight, g | weight, g | 2 weeks | 4 weeks | 8 weeks |
| 12 | 100 | 10 | 400 | 600 | 760 |
| | | 20 | 600 | 600 | 760 |
| | | 50 | 600 | 1000 | 1200 |
| | | 75 | 1200 | 1600 | 1720 |
| | | 100 | 1400 | 1600 | 2400 |
| 8 | 100 | 10 | 0 | 0 | 0 |
| | | 20 | 0 | 0 | 0 |
| | | 50 | 0 | 0 | 520 |
| | | 75 | 0 | 0 | 520 |
| | | 100 | 600 | 600 | 1920 |
| 4 | 100 | 10 | 0 | 0 | 0 |
| | | 20 | 0 | 0 | 0 |
| | | 50 | 0 | 0 | 0 |
| | | 75 | 0 | 0 | 480 |
| | | 100 | 0 | 0 | 480 |

EXAMPLE 8

A synthetic waste pickle liquor including 150,000 ppm $SO_4^-$ ion and 10,000 ppm $FE^{++}$ ion was prepared and divided into two parts. Parts were neutralized with either high calcium hydrated lime or dolomitic monohydrated lime to a pH of 12.4. Portions of the resulting sludges were mixed with varying quantities of a typical bituminous fly ash indicated in the table below. The resultant compositions were formed into 2 inch cubes using where possible those techniques described by ASTM. After moist curing for 14 and 28 days the cubes were broken in compression (unconfined). The table below gives the compressive strength data in lbs/sq. inch; in each case the result is the average of three specimens.

SLUDGE/FLY ASH CUBE COMPRESSIVE STRENGTH DATA

| Type Sludge | pH | % fly ash Added to Sludge | Compressive Strength (psi) 14 days | 28 days |
|---|---|---|---|---|
| High calcium | 12.4 | 10 | 17 | 39 |
| High calcium | 12.4 | 20 | 57 | 138 |
| High calcium | 12.4 | 50 | 324 | 441 |
| High calcium | 12.4 | 75 | 783 | 1362 |
| High calcium | 12.4 | 100 | 548 | 588 |
| Dolomitic | 12.4 | 10 | 22 | 58 |
| Dolomitic | 12.4 | 20 | 74 | 167 |
| Dolomitic | 12.4 | 50 | 373 | 718 |
| Dolomitic | 12.4 | 75 | 866 | 1780 |
| Dolomitic | 12.4 | 100 | 1776 | 2625 |

EXAMPLE 9

Samples of two waste sludges from a chemical processing plant were obtained; these had elemental analyses as noted in the first table, below.

These were adjusted to a pH of 12 with dolomitic monohydrated lime, and varying amounts of fly ash, as noted in the second table, were blended with the sludges. The resultant mixtures were placed in segments of stainless steel tubing 2 inches in diameter by 6 inches long which were capped at one end with nylon cloth held in place with a rubber band. The test assemblies were placed in 1 inch of deionized water in aquaria.

At varying intervals, as indicated in the second table, these specimens were tested for resistance to penetration (determined as resistance in lbs/sq. in.) required for penetration 1 inch into the specimen by a 0.025 sq. in. rod.

Note specifically that certain of the specimens which, because of their high fly ash content, would have been damp sandy masses were modified with excess water to a pourable state.

X-Ray Fluorescence Analysis Of Wet Basin and Dry Waste Samples

| | Wet Basin | Dry Waste |
|---|---|---|
| Pb | >5% | >5% |
| Ca | 0.2–5.0% | 0.2–5.0% |
| Ba | 0.2–5.0% | 0.2–5.0% |
| Fe | 0.2–5.0% | 0.2–5.0% |
| Al | 0.2–5.0% | 0.2–5.0% |
| Si | 0.2–5.0% | 0.2–5.0% |
| S | 0.2–5.0% | 0.2–5.0% |
| Ti | <0.2% | <0.2% |
| Ni | <0.2% | <0.2% |
| Cu | <0.2% | <0.2% |
| Zn | <0.2% | <0.2% |
| Mo | <0.2% | <0.2% |
| Sb | <0.2% | <0.2% |
| Sr | <0.2% | <0.2% |
| P | <0.2% | <0.2% |
| Cl | <0.2% | <0.2% |
| K | <0.2% | <0.2% |
| % Solids | ≈21 | ≈40 |
| pH | ≈5 | ≈6.5 |

CHEMICAL PLANT WASTE SLUDGES ADJUSTED TO pH 12, WITH VARYING PROPORTIONS OF FLY ASH

| | Wet Basin Penetration Resistance (psi) 1 week | 2 weeks | 4 weeks |
|---|---|---|---|
| +20% Fly Ash | 0 | 0 | 0 |
| +50% Fly Ash | 0 | 0 | 0 |
| +75% Fly Ash | 0 | 0 | 0 |
| +100% Fly Ash | 0 | 400 | 800 |
| +125% Fly Ash | 240 | 400 | 3000 |
| +150% Fly Ash | 960 | 3080 | 7200 |
| The following compositions were modified with excess water to a pourable state: | | | |
| +125% Fly Ash | 160 | 920 | 1680 |
| +150% Fly Ash | 160 | 1280 | 2000 |
| | **Dry Waste Penetration Resistance (psi) 1 week** | **2 weeks** | **4 weeks** |
| +20% Fly Ash | 0 | 0 | 0 |
| +50% Fly Ash | 0 | 0 | 300 |
| +75% Fly Ash | 0 | 0 | Trace |
| +100% Fly Ash | 0 | 0 | 600 |
| +125% Fly Ash | 160 | 600 | 6800 |
| +150% Fly Ash | 680 | 1480 | 8000+ |
| The following compositions were modified with excess water to a pourable state: | | | |
| +125% Fly Ash | 560 | 8000+ | 8000+ |
| +150% Fly Ash | 800 | 8000+ | 8000+ |

EXAMPLE 10

The waste sludge from a hydrofluoric acid manufacturing process was found to be principally $CaSO_4$ (commonly referred to as anhydrite) with only minor impurities. The moisture content was found to be approximately 15 percent.

Penetration resistance specimens were prepared and tested as in the previous examples.

| | 1 week | 2 weeks | 4 weeks |
|---|---|---|---|
| HF Sludge + 0% Fly Ash | 0 psi | 0 psi | 0 psi |
| HF Sludge + 10% Fly Ash | 0 psi | 0 psi | 0 psi |
| HF Sludge + 20% Fly Ash | 0 psi | 0 psi | 0 psi |
| HF Sludge + 50% Fly Ash | 400 psi | 400 psi | 400 psi |
| HF Sludge + 75% Fly Ash | 400 psi | 1200 psi | 2400 psi |

-continued

| | 1 week | 2 weeks | 4 weeks |
|---|---|---|---|
| HF Sludge + 100% Fly Ash | 0 psi | 0 psi | 600 psi |

EXAMPLE 11

The same waste sludge used in Example 10 (principally a $CaSO_4$ sludge with only minor impurities and approximately 15 percent water content) was mixed with fly ash and water, then formed into 2 inch cubes. The mix composition was 1,000 g sludge, 750 g typical bituminous fly ash and 105 mls deionized water. A laboratory Hobart N-50 mixer (similar to a kitchen mixer, but heavy duty) was used to blend the sludge and fly ash. The compositions were tamped into 2 inch cube molds of the type used for Portland Cement compressive strength testing. These were broken as for unconfined compressive strength; the results are tabulated below:

| Curing Age | Compressive Strength |
|---|---|
| 1 week | 765 psi |
| 2 weeks | 883 |
| 4 weeks | 1475 |

EXAMPLE 12

Cylinders 4 inches in diameter were prepared using the compositions listed below in conjunction with the following method: Dolomitic monohydrated lime, fly ash, sludge, (prepared as outlined in Examples 1 through 6) and graded dolomitic aggregate were dry mixed, then thoroughly mixed with approximately 8 percent water. The dampened material was formed into 4 inch diameter cylinders using a 10 lb. rammer to compact each of its three layers. Formed specimens were cured in sealed containers at 100° F for 7 days. At the end of this time they were saturated in water and were tested for unconfined compressive strength. The specific test procedure is ASTM C 593 (Specification for Fly Ash and Other Pozzolans for Use With Lime); the dolomitic aggregate used meets Pennsylvania Department of Highways Specification Section 703 Designation 2A.

| | |
|---|---|
| 0.5% sludge solids neutralized to pH 7 with high calcium hydrated lime<br>1% dolomitic monohydrate<br>11.5% fly ash<br>87% dolomitic aggregate | Strength: 192 psi |
| 0.5% sludge solids neutralized to pH 12 with high calcium hydrated lime<br>1% dolomitic monohydrate<br>11.% fly ash<br>87% dolomitic aggregate | Strength: 380 psi |
| 0.5% sludge solids neutralized to pH 7 with dolomitic monohydrate<br>1% dolomitic monohydrate<br>11.5% fly ash<br>87% dolomitic aggregate | Strength: 385 psi |
| 0.5% sludge solids neutralized to pH 12 with dolomitic monohydrate<br>1% dolomotic monohydrate<br>11.5% fly ash<br>87% dolomitic aggregate | Strength: 470 psi |

EXAMPLE 13

Additional compositions were made utilizing the method of preparation and curing outlined in Example 12, and the same waste sludge as in Example 10. These results were as follows:

Mix A
Fly Ash - 28.0%
Graded Ottawa Sand - 72.0% - Compressive Strength: 63 psi
Mix B
1.5% sulfate sludge pH adjusted above 12 with dolomitic monohydrated lime
Fly Ash - 26.5%
Graded Ottawa Sand - 72.0% - Compressive Strength: 495 psi

EXAMPLE OF USE OF THE COMPOSITION OF PRESENT INVENTION

Typically, a composition consisting of about one part waste sludge and 0.5 to 4 parts fly ash may be mixed in a pug mill type mixer.

Other reactive materials, such as alumina, sulfates, or lime, and aggregate, such as crushed stone, gravel, sand or soil, may also be included in the mix and water may be added to produce a damper or even pourable mixture. This composition would then be distributed over a placement site and if used damp could be compacted to produce, for example, a sub-surface which may then be overlaid with asphaltic concrete and immediately opened to traffic or other intended uses.

What is claimed is:

1. The method of treating *an* aqueous chemical waste [sludges] *sludge including a sulfate compound* comprising adding to said [sludges] *sludge* sufficient lime, [aluminum-containing material] *fly ash* and water soluble sulfate compound to produce a composition having available sulfate ions, a second type of available ion selected from the group consisting of aluminum and ferric ions, the concentration of which is expressed in $Al_2O_3$ equivalents, and a third type of available ions selected from the group consisting of calcium and magnesium, the concentration of which is expressed in CaO equivalents, wherein the composition, including available ions in said added lime, [aluminum-containing material] *fly ash* and water soluble sulfate compounds includes at least 0.5 weight percent [$—SO_4$] *($—SO_4$)*$^{-2}$, at least 0.2 weight percent $Al_2O_3$ and equivalents thereof, and at least 0.5 weight percent CaO and equivalents thereof, *the fly ash being present in said composition in an amount of at least 20% by weight of the amount of sludge in said composition, said composition being cementitiously hardenable through chemical reactions the products of which include calcium sulfo-aluminate hydrate or calcium alumino-sulfate hydrate, and allowing said composition to harden by chemical reaction to develop penetration resistance therein under atmospheric conditions.*

[2. A method, as recited in claim 1, wherein said aluminum ion yielding material is fly ash.]

3. A method, as recited in claim 1, wherein the weight ratios of available ions in said composition are in the range ($Al^{+3}$ and $Ca^{+2}$ include $Al^{+3}$ and $Ca^{+2}$ equivalents, respectively):

$Al^{+3}$:$Ca^{+2}$ from 1:10 to 1:2
$Al^{+3}$:$(SO_4)^{-2}$ from 1:2 to 1:10
$Ca^{+2}$:$(SO_4)^{-2}$ from 1:2 to 2:1

4. A method, as recited in claim 1, wherein said water soluble sulfate is calcium sulfate anhydrite, calcium sulfate hemihydrate, or calcium sulfate dihydrate.

5. A method, as recited in claim 1, wherein said sludge is the waste product of an acid making plant, said method consisting of adding lime and fly ash to obtain a composition as recited in claim 1.

6. A method, as recited in claim 1, wherein said sludge is the pickle liquor waste product of a steel plant, said method consisting of adding lime and fly ash to obtain a composition as recited in claim 1.

7. A composition comprising the reaction product of an aqueous chemical waste sludge *including a sulfate compound* and selected additive materials said additive materials being selected so that the total composition of said additive materials and said sludge includes *fly ash in a proportion of at least 20% of said sludge,* available sulfate ions, a second type of available ion selected from the group consisting of aluminum and ferric ions, the concentration of which is expressed in $Al_2O_3$ equivalents, and a third type of available ions selected from the group consisting of calcium and magnesium, the concentration of which is expressed in CaO equivalents, wherein the composition includes at least 0.5 weight percent [$-SO_4$] *($-SO_4$)*$^{-2}$, at least 0.2 weight percent $Al_2O_3$ and equivalents thereof, and at least 0.5 weight percent CaO and equivalents thereof, wherein the weight ratios of available ions in said composition are in the range ($Al^{+3}$ and $Ca^{+2}$ includes $Al^{+3}$ and $Ca^{+2}$ equivalents, respectively):

$Al^{+3}$:$Ca^{+2}$ from 1:10 to tol: 2

$Al^{+3}$:$(SO_4)^{-2}$ from 1:2 to 1:10

$Ca^{+2}$:$(SO_4)^{-2}$ from 1:2 to 2:1,

*said composition, prior to reaction, being cementitiously hardenable through chemical reactions the products of which include calcium sulfo-aluminate hydrate or calcium alumino-sulfate hydrate, and allowing said composition to harden by chemical reaction to develop penetration resistance therein under atmospheric conditions.*

[8. A composition, as recited in claim 7, wherein said aluminum ions yielding material is fly ash.]

9. A composition as recited in claim 7, wherein said sludge is the waste product of an acid making plant.

10. A composition as recited in claim 7, wherein said sludge is the pickle liquor waste product of a steel plant.

11. The method of making a cementitious composition comprising adding [the] *to an* aqueous chemical waste [sludges] *sludge including a sulfate compound,* sufficient lime, [aluminum-containing materials] *fly ash* and water soluble sulfate compound to produce a composition having available sulfate ions, a second type of available ions selected from the group consisting of aluminum and iron ions, the concentration of which is expressed in $Al_2O_3$ equivalents, and a third type of available ions selected from the group consisting of calcium and magnesium, the concentration of which is expressed in CaO equivalents, wherein the composition includes at least 0.5 weight percent [$-SO_4$] *($SO_4$)*$^{-2}$ at least 0.2 weight percent $Al_2O_3$ and equivalents thereof, and at least 0.5 weight percent CaO and equivalents thereof, *the fly ash being present in said composition in an amount of at least 20% by weight of the amount of sludge in said composition, said composition being cementitiously hardenable through chemical reactions the products of which include calcium sulfo-aluminate hydrate or calcium alumino-sulfate hydrate, and allowing said composition to harden by chemical reaction to develop penetration resistance therein under atmospheric conditions.*

[12. A method, as recited in claim 11, wherein said aluminum ion yielding material is fly ash.]

13. A method, as recited in claim 11, wherein the weight ratios of available ions in said composition are in the range ($Al^{+3}$ and $Ca^{+2}$ include $Al^{+2}$ and $Ca^{+2}$ equivalents respectively):

$Al^{+3}$:$Ca^{+2}$ from 1:10 to 1:2

$Al^{+3}$:$(SO_4)^{-2}$ from 1:2 to 1:10

$Ca^{+2}$:$(SO_4)^{-2}$ from 1:2 to 2:1

14. A method, as recited in claim 11, wherein said water soluble sulfate is calcium sulfate anhydrite, calcium sulfate hemihydrate, or calcium sulfate dihydrate.

15. A method, as recited in claim 11, wherein said sludge is the waste product of an acid making plant, said method consisting of adding lime and fly ash to obtain a composition as recited in claim 11.

16. A method, as recited in claim 11, wherein said sludge is the pickle liquor waste product of a steel plant, said method consisting of adding lime and fly ash to obtain a composition as recited in claim 11.

*17. A method, as recited in claim 11, wherein said composition is damp and compactible.*

*18. A method, as recited in claim 11, wherein said composition is pourable.*

*19. A method, as recited in claim 11, wherein the ratio of calcium and magnesium ions in said composition to sulfate ions in said composition is in the range of from 2:1 to 1:2.*

*20. A method, as recited in claim 1, wherein said composition includes from 0.5 to 4 parts fly ash per part sludge (by weight).*

*21. A composition, a recited in claim 7, wherein, prior to reaction, said composition includes from 0.5 to 4 parts fly ash per part sludge (by weight).*

*22. A method, as recited in claim 11, wherein said composition includes from 0.5 to 4 parts fly ash per part sludge (by weight).*

* * * * *

UNITED STATES PATENT AND TRADEMARK OFFICE

CERTIFICATE OF CORRECTION

PATENT NO. : RE. 29,783

DATED : Sept. 26, 1978

INVENTOR(S) : Charles L. Smith et al.

It is certified that error appears in the above—identified patent and that said Letters Patent is hereby corrected as shown below:

Insert the sheet of drawing as part of Letters Patent, as shown on the attached sheet.

Signed and Sealed this

*Twenty-ninth* Day of *June 1982*

[SEAL]

*Attest:*

*Attesting Officer*

GERALD J. MOSSINGHOFF

*Commissioner of Patents and Trademarks*

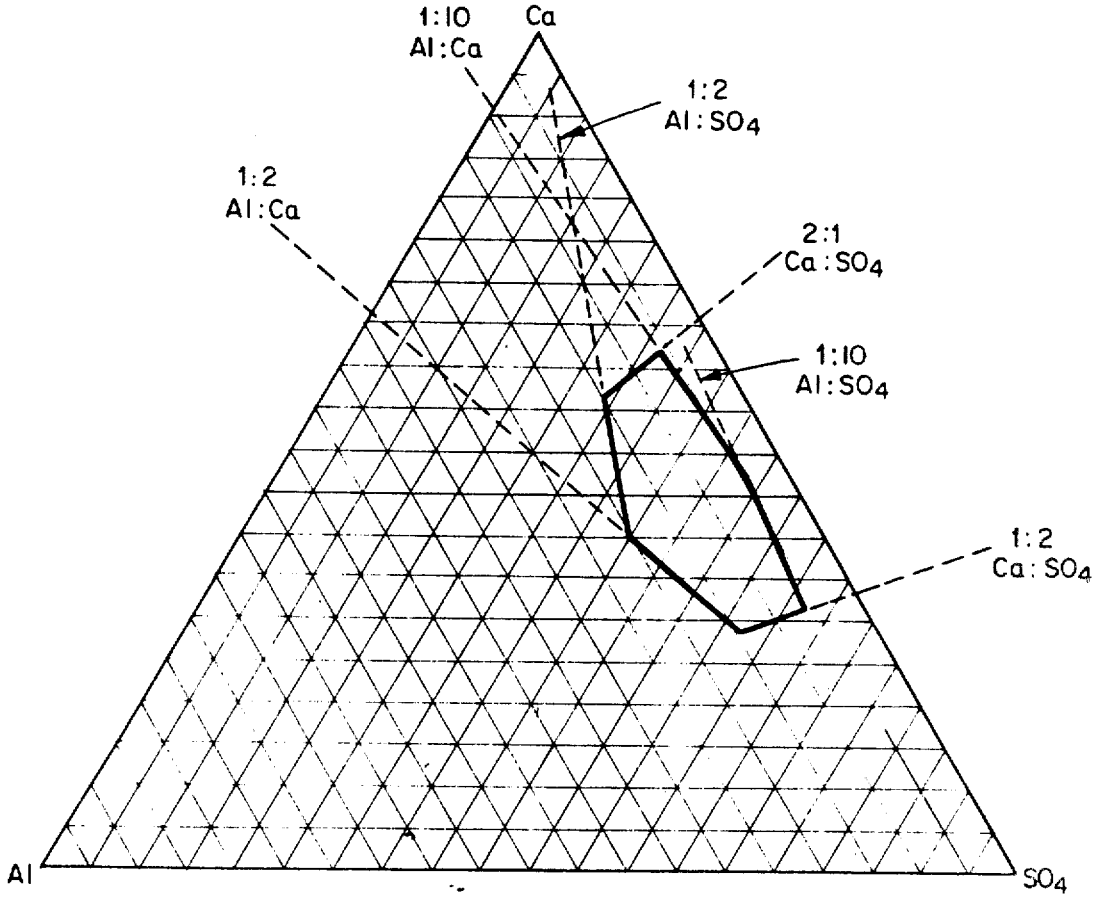
1:10
Al:Ca
Ca
1:2
Al:SO4
1:2
Al:Ca
2:1
Ca:SO4
1:10
Al:SO4
1:2
Ca:SO4
Al
SO4